United States Patent Office 3,429,615
Patented Feb. 25, 1969

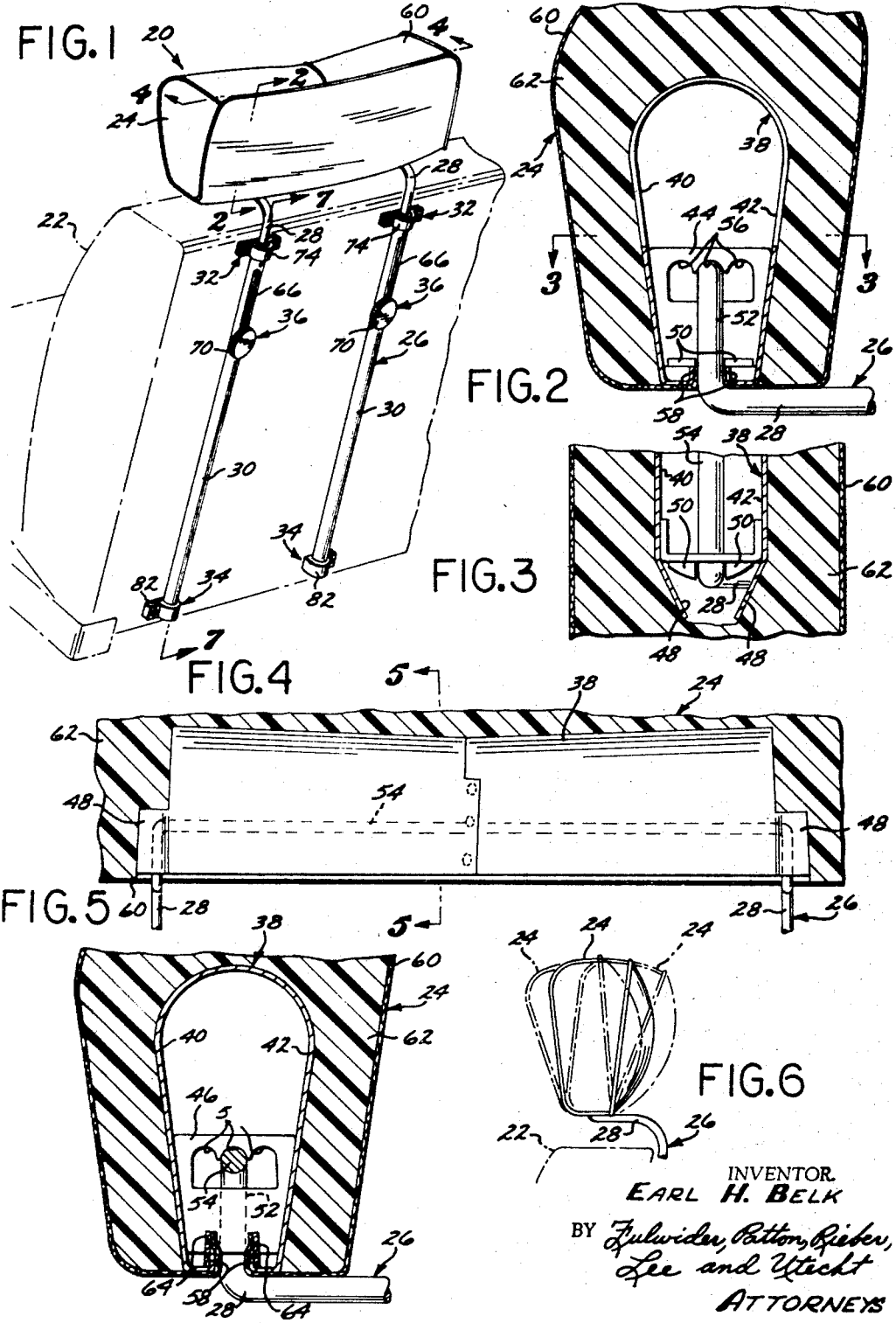

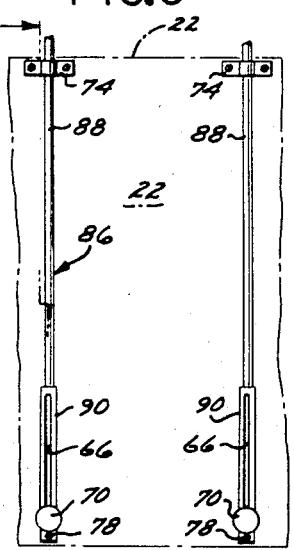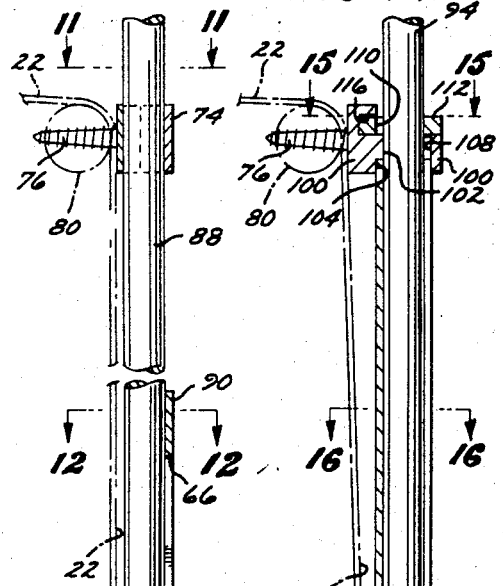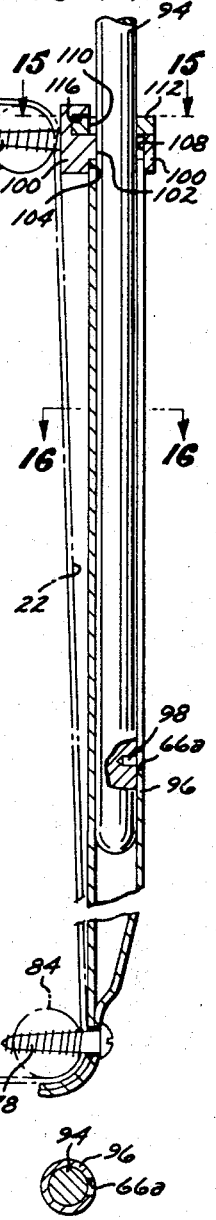

3,429,615
HEAD REST FOR VEHICLE SEAT
Earl H. Belk, 931 Long Beach Blvd.,
Long Beach, Calif. 90813
Original application Mar. 21, 1966, Ser. No. 535,827, now Patent No. 3,337,268, dated Aug. 22, 1967. Divided and this application May 25, 1967, Ser. No. 641,344
U.S. Cl. 297—410                                      8 Claims
Int. Cl. A47c *1/10, 7/38;* B60n *1/00*

ABSTRACT OF THE DISCLOSURE

A head rest for a vehicle seat and including a pair of elongated arms telescopable in a complementary pair of columns, the columns being attachable to the vehicle seat frame and designed for location within or upon the back of the vehicle seat, and the head rest further including a clamp assembly for fixedly clamping the arms relative to the columns in various vertical positions of the head rest and for preventing separation of the arms from the columns in an accident or the like.

---

This application is a divisional application of my co-pending application entitled, "Head Rest for Vehicle Seat," filed Mar. 21, 1966, Ser. No. 535,827, now Patent No. 3,337,268.

The present invention relates to a head rest for a vehicle seat, and more particularly to a head rest mountable adjacent the upper extremity of a vehicle seat to cushion the neck and head of a vehicle occupant and thereby provide protection in the event of an accident such as a rear end collision.

The forces developed upon the neck and head of a vehicle occupant during a rear end collision can be sufficiently great that the head is violently thrown backwardly to produce the soft tissue injury to the neck and adjoining areas commonly known as a "whiplash injury." These forces can be absorbed to a great extent by locating a bolster or head rest immediately behind the neck and head and attaching it to the vehicle seat. The head rest projects above the seat and tends to cushion and decelerate the mass of the head during a rear end collision. In this position the head rest is subject to considerable stress and must be securely mounted to the seat to prevent it from being torn loose. A rigid mounting would solve this problem, but the head rest must be vertically adjustable to conform to the stature of the user, and it should desirably also be adjustable in a fore-and-aft direction. Adequate protection is vital but passenger comfort is almost equally important.

In a vehicle collision, loose objects are converted into lethal projectiles and the head rest must not be subject to inadvertent separation from its support means, despite the desirability of proving for adjustability and easy installation.

Consequently, it is an object of the present invention to provide a head rest for a vehicle seat which is securely mounted to the vehicle seat in a manner which prevents violent separation from the seat during a collision, inadvertent separation due to improper use by the user, and which also is adjustable in location to provide a comfortable head rest during normal driving.

Another object of the invention is the provision of a head rest of the aforementioned character which projects above the upper extremity of the vehicle seat for engagement by the user's head and neck, and which is anchored or secured to the seat by support means having widely vertically spaced apart connections to the seat frame for optimum resistance to separation from the seat.

A further object of the invention is to provide a head rest of the aforementioned character which is vertically adjustable to conform to the stature of the user, and which includes support means affording positive prevention of vertical separation between the head rest and seat.

Another object of the invention is the provision of a head rest of the aforementioned character which is adjustable in a fore-and-aft direction by merely grasping and raising the head rest for repositioning, and yet which is normally resistant to collision-induced fore-and-aft movement.

Yet another object of the invention is to provide a head rest of the aforementioned character which includes a progressively deformable sheet material portion for absorption of high acceleration forces.

A further object of the invention is the provision of a head rest of the aforementioned character which is relatively inexpensive to manufacture, rugged in construction, and adapted for use as original equipment or "aftermarket" equipment, that is, for installation on used vehicles, for example.

These and other objects and advantages of the following detailed description, when taken in conjunction with the appended drawings wherein:

FIG. 1 is a perspective view of a head rest structure, according to the present invention, installed on the back of a vehicle seat;

FIG. 2 is an enlarged cross-sectional view taken along the line 2—2 of FIG. 1;

FIG. 3 is an enlarged view taken along the line 3—3 of FIG. 2;

FIG. 4 is an enlarged view taken along the line 4—4 of FIG. 1;

FIG. 5 is an enlarged view taken along the line 5—5 of FIG. 4;

FIG. 6 is a side elevational view of the head rest, the various fore-and-aft positions of the head rest illustrated in dash-dot outline;

FIG. 7 is an enlarged view taken along the line 7—7 of FIG. 1;

FIG. 8 is a view taken along the line 8—8 of FIG. 7;

FIG. 9 is a rear elevational view of a second head rest structure according to the present invention;

FIG. 10 is an enlarged view taken along the line 10—10 of FIG. 9;

FIG. 11 is a view taken along the line 11—11 of FIG. 10;

FIG. 12 is a view taken along the line 12—12 of FIG. 10;

FIG. 13 is a rear elevational view of a third head rest structure according to the present invention;

FIG. 14 is an enlarged view taken along the line 14—14 of FIG. 13;

FIG. 15 is a view taken along the line 15—15 of FIG. 14; and

FIG. 16 is a view taken along the line 16—16 of FIG. 14.

Referring now to the drawings, and particularly to FIGS. 1 through 8 thereof, there is illustrated a head rest structure 20, according to the present invention. The structure 20 is shown mounted to the generally vertically oriented back 22 of a seat of the type commonly used in automobiles and the like. However, it will be apparent from the description hereinafter made that the structure 20 may also be applied or mounted to the seat structures of various other types of vehicles. In addition, the particular application for the structure 20 which is described herein is an attachment of the structure 20 to the rear face of the seat back 22. However, it will be apparent from the description which follows that the structure 20 may be installed as "original equipment" in newly manufactured vehicles, in which case certain components of the structure 20 would be located internally of outer surfaces of the seat back 22 as an integral and concealed part of the seat structure.

The head rest structure 20 comprises, generally, a transversely oriented bolster or head rest 24 superjacent the upper extremity of the seat back 22; a support structure 26 for the head rest 24 and which includes a pair of elongated, vertically oriented and transversely spaced apart support arms 28 mounted at their upper extremities to the head rest 24, and a complemental pair of elongated, vertically oriented support columns 30 telescopably cooperative with the arms 28; securement assemblies 32 and 34 mounting the upper and lower portions of the support structure 26 to the seat back 22; and clamp assemblies 36 which are operative to control and fix the positions of the support arms 28 relative to the support columns 30 to thereby adjust the vertical position of the head rest 24.

As best viewed in FIGS. 2 through 5, the head rest 24 includes a transversely extending central core 38 having a curvilinear upper portion from which depend front and rear panels 40 and 42. This configuration is defined by bending sheet material, preferably 26 gage sheet metal, into an inverted U-shape. The panels 40 and 42 extend laterally beyond the curved portion of the core 38 and these extensions are bent toward each other, as best viewed in FIG. 3. The bent extensions locate a pair of transversely spaced arm brackets 44 and 46 which fit between and adjacent the lower extremities of the inwardly divergent panels 40 and 42.

The brackets 44 and 46 are preferably made of sheet metal and include inwardly formed side flanges 48 which are spot-welded to the adjacent panels 40 and 42. In addition, the lower edge of each bracket 44 and 46 includes a pair of outwardly turned tabs 50 which are spaced apart to define an opening through which extends one of the support arms 28. In this regard, each arm 28 includes a vertical portion which extends down the seat back 22, a forwardly formed, substantially horizontal portion which projects over the upper end of the seat back 22, and a short vertical portion 52 which extends through the space between the tabs 50 of the associated one of the arm brackets 44 and 46.

The support arms 28 are integrally connected together by a transverse element or portion 54, as best viewed in FIG. 5, which constitutes an integral continuation of the arm vertical portions 52. By reason of the location of the portions 52, the lower end of the core 38, and consequently the head rest 24, is immovable in a fore-and-aft direction relative to the support arms. However, the head rest 24 is tippable in a fore-and-aft direction about a transverse axis generally coincident with the openings between the tabs 50 of the brackets 44 and 46, the openings being somewhat larger than the cross section of the arm vertical portions 52 for this purpose.

More particularly, each of the brackets 44 and 46 includes an opening characterized by an upper margin defining three adjacent curved edges or seats 56 each of which includes fore-and-aft portions or edge margins defining an entry throat therebetween which opens downwardly, and each of which closely approximates the size of the round stock of which the transverse arm portion 54 is made. By grasping the head rest 24, moving it upwardly, and then tipping it in a fore-and-aft direction it is possible to locate the transverse arm portion 54 in one or the other of the seats 56 to thereby adjust the inclination of the head rest 24 to suit the user. The weight of the head rest 24 is sufficient to firmly seat the arm portion 54 in the selected seat 56, and it has been found that the head rest maintains this selected position under relatively high acceleration and deceleration forces.

Although not shown, it will be apparent that an obvious alternative structure to provide fore-and-aft adjustment of the head rest 24 is to eliminate the vertical arm portions 52 and the transverse arm portion 54 and instead provide a transverse rod (not shown) in the same position previously occupied by the portion 54, and weld or otherwise secure the ends of this transverse rod to the ends of the head rest 24 so that it is integral therewith. The arm brackets 44 and 46 are then demounted from the head rest 24 and made an integral part of the arm 28, as by welding or the like, and with the seats 56 located in or defined by the lower margins of the openings in the brackets 44 and 46. This is, in effect, a reversal of the parts illustrated in the drawings, with the head rest 24 and the transverse rod being tipped for adjustment relative to the arms 28 and the now stationary brackets 44 and 46 attached to the arms 28.

Coming back to the embodiment illustrated, the lower edges of the core panels 40 and 42 are bent or formed inwardly toward each other and then upwardly to form flanges 58 which define continuations of the openings between the tabs 50 for receiving the arm vertical portions 52. The flanges 58 engage and thereby aid in locating the arm brackets 44 and 46 in proper position, and also serve as retainers for a flexible cloth or vinyl cover 60.

More particularly, the sheet metal head rest core 38 is covered by a layer of molded or otherwise shaped polyurethane foam material 62, and the cover 60 contains and overlies the material 62 to hold it in place. The hollow cover 60 is fabricated in any suitable fashion, as by cutting sections to the proper shape and assembling them with usual welting, and is characterized by a transverse slot in its lower side which is defined by a pair of opposed flaps having elongated, transversely extending strips 64 made of a stiff material such as pressed fibers or paper.

The cover 60 is tightly fitted over the foam material 62 upon the core 38 by drawing the cover 60 over and down upon the material 62 and tucking the strips 64 and their mounting flaps upwardly through the slot defined by the flanges 58. The strips 64 are then pressed downwardly into positions on the opposite sides of the flanges 58 to anchor the taut cover 60 in the position illustrated in FIG. 5.

The head rest 24 may be made in a variety of configurations, depending upon the shape of the core 38 and foam material 62 utilized, but the configuration illustrated is preferred. In this regard, the central portion of the core 38 is preferably rearwardly offset relative to the core ends, as best illustrated in FIG. 4, to better and more comfortably center the head of the user. This is done by appropriately cutting the core 38 in the middle, rearwardly displacing the severed ends, and spot welding overlapping portions of the adjacent ends.

The sheet metal core 38 provides several important advantages over the prior art. It serves as a form to facilitate orientation of the foam material 62 and, by reason of the relatively great amount of hollow space it defines, greatly reduces the amount of relatively high cost foam material needed to form a head rest of adequate size. In addition, the sheet metal of the core progressively crushes under high acceleration forces to better cushion the user's head. The foam material 62 provides a comfortable, cushioned pad for the head, but under extreme acceleration the sheet metal core 38 is needed for proper absorption of acceleration energy.

The elongated support arms 28 are preferably of circular cross section and made of good quality steel to withstand bending forces developed during rearward movement of the user's head against the head rest 24. The arms 28 telescopably extend into the hollow central openings in the U-shape columns 30, and are vertically adjustable relative to the columns 30. More particularly, each column 30 includes a vertically extending travel slot 66, as best viewed in FIGS. 1 and 8, through which extends the threaded stud 68 of a clamping knob 70 constituting a part of the clamp assembly 36. The study 68 is freely slidable in the slot 66 and is threaded into a threaded opening 72 in the lower extremity of the associated support arm 26. By loosening the knobs 70, the support arms 29 may be moved vertically in the columns 30 to adjust the vertical position of the head rest 24. The knobs 70 are then tightened to maintain the adjusted position. However, it is important to note that the arms 28 are prevented from vertically separating from the columns 30 by reason of engagement between the studs 68 and the upper ends of the slots 66. Thus, it is impossible for inadvertent separation to occur, during a collision or otherwise, even if the knobs 70 are incompletely tightened.

It will be apparent that the cross sectional configurations of the arms 28 and columns 30 need not be circular and U-shape, but could, for example, be of channel-shape if desired.

The upper ends of each of the support columns 30 is fixed to the seat back 22 by an upper bracket 74 which forms a part of one of the securement assemblies 32. Each bracket 74 overlies its column 30 and includes lateral legs through which are disposed a pair of self-tapping metal screws 76. The screws 76 pass through a back plate 78 which underlies the column 30, and extend into suitable openings provided in a tubular upper frame portion 80 which forms a part of the framework of the vehicle seat back 22. In similar fashion, the lower end of each column is fixed to the seat back by a pair of metal screws 78 which pass through a lower bracket 82 forming a part of one of the securement assemblies 34. Each bracket 82 includes a portion overlying its associated column 30, and a reversely formed portion underlying the column. The screws 78 pass through both of these portions and extend into a suitable pair of openings provided in a tubular lower frame portion 84 which is part of the seat back framework.

Referring now to FIGS. 9 through 12, there is illustrated a second form of head rest structure, designated generally by the numeral 86, and generally similar to the head rest structure 20 except for the support structure for the head rest 24.

The head rest structure 86 includes a pair of support arms 88 which are identical to support arms 28 except that they are longer, extending farther down the back of the seat back 22 for slidable, telescopable disposition within a pair of support columns 90, which are shorter than the support arms 30 of the first embodiment. The arms 88 are freely slidable in the upper brackets 74, being merely constrained against lateral movement by the brackets 74.

The upper ends of the columns 90 are not secured to the seat back but are instead constrained against lateral movement by the arms 88 which extend into them. The lower ends of the columns 90 are secured to the frame lower portion 84 by metal screws 78 which extend through openings provided in the lower ends of the columns 90.

The clamping knobs 70, as was the case in the first embodiment, extend through travel slots 66 provided in the columns 90 and are threaded into suitable openings provided in the lower ends of the support arms 88.

Thus, the head rest structure 86 operates in a manner substantially identical to the first-described structure 20 and is different primarily in the lack of positive attachment of the upper ends of the columns 90 to the seat back 22 and the absence of lower brackets 82. This provides a more economical structure without sacrifice to structural strength. The two-point anchorage for each set of support arms and columns is still present at the upper and lower extremities of the seat back, as in the case of the first embodiment, to thereby provide the unique resistance to bending which characterizes all of the embodiments described herein.

Referring now to FIGS. 13 through 16, there is illustrated a third head rest structure 92. In this particular embodiment the pair of support arms 94 are substantially identical to the first-described support arms 28, and telescopably and slidably extend into a complemental pair of support columns 96 which are substantially identical to the columns 30 of the first embodiment. However, the support columns are each tubular in configuration, are flattened at their lower extremity to receive the metal screw 78 for securement to the lower frame portion 84, and include a slot 66a which has no upper terminus but instead extends through the upper end of the column 96.

The lower extremity of each support arm 94 fixedly mounts a pin 98 having an enlarged head which slidably fits within the associated travel slot 66a of the column 96.

The upper securement for the upper extremity of each column 96 is constituted by a cam bracket 100 having a central bore 102 and an adjacent counterbore 104. The bracket 100 includes a pair of flanges or legs 106 which receive a pair of the machine screws 76 for securement of the bracket 100 to the upper frame portion 80 of the seat back 22.

Each support arm 94 is slidably carried in the bore 102 of the cam bracket 100, while the upper end of the associated support column 96 is seated within the counterbore 104. The head of pin 66a is able to pass through the bracket 100 when, for example, it is desired to separate the arm 94 and the column 96, by reason of the provision of a vertical slot 108 in the bracket 100. The slot 108 forms a continuation of the adjacent counterbore 104, through both of which the arm 94 and its pin 98 can freely pass.

A vertical slot 110 complemental to the slot 108 is also provided in the inner surface of the central opening of a cam arm 112 which is rotatably carried by each arm 94 above the cam bracket 100.

The central opening in the cam arm 112 is approximately the same diameter as the bore 102, but is eccentrically located with respect to the circular periphery of the central portion of the cam arm 112.

By virtue of the eccentric mounting of the cam arm 112 upon the arm 94, a section of the central portion of the cam arm 112 constitutes a cam rise 114 adapted to forcibly engage the base of a horizontal channel 116 formed in the cam bracket 100, and within which the circular periphery of the cam arm 112 is rotatable. The cam arm 112 includes a lateral extension 118 to facilitate such rotation.

When the cam arm 112 is in the locked or clamped position illustrated in FIGS. 14 and 15, the slot 110 thereof is out of alignment with the slot 108 so that the pin 98 cannot clear the cam arm 112, thereby making it impossible to inadvertently separate the arms 94 from the columns 96. In addition, the forcible engagement of the bracket 100 by the cam rise 114 in this position presses the associated support arm 94 against the bore 102 of the bracket 100, thereby clamping the arm 94 in position, and also presses the arm 94 against the support column 96, which presses the column 96 against the counterbore 104, thereby clamping the column 96 in position. Thus, both the arms 94 and the columns 196 are securely clamped to the seat back 22 by the action of the two cam arms 112.

When the head rest structure 92 is to be assembled, or when it is desired to separate the arms 94 from the columns 96, the cam arms 112 are merely rotated to vertically align the slots 108 and 110.

If desired, the travel slot 66a could take the form of a vertically elongated groove in the wall of the column 96, large enough to slidably accommodate the pin 98. This may be advantageous in reducing the cost of manufacture of the structure 92.

From the foregoing, it will be apparent that a head rest structure has been provided which is adapted to withstand high acceleration forces without allowing inadvertent separation of the head rest from the seat back. Moreover, the vertically spaced points of attachment of the head rest structure to the seat back provide a structure highly resistant to backward bending and separation from the seat back, such as during a collision.

The head rest structure can be attached to already manufactured seat backs, or it can be incorporated within the seat back during manufacture thereof. This would merely require that the securement means for the head rest supporting structure be located internally of the seat back, and be capable of anchoring the supporting structure in this position.

Various modifications and changes may be made with regard to the foregoing detailed description without departing from the spirit of the invention or the scope of the following claims.

I claim:
1. In a head rest for a vehicle seat having a frame including vertically spaced apart frame portions, the combination of:
a transversely oriented head rest located superadjacent the upper extremity of said seat;
support means for said head rest and including a pair of elongated, vertically oriented hollow support arms mounted at their upper extremities to said head rest in transversely spaced apart relation, and a complemental pair of elongated, vertically oriented support columns telescopably receiving said support arms, respectively, whereby said support arms are vertically movable relative to said support columns, each of said support columns including an elongated, vertically oriented slot;
first securement means mounting said support means to the upper one of said frame portions;
second securement means fixing said support columns to the lower one of said frame portions; and
a plurality of clamp means engaged upon said support means and operative to fixedly clamp said support arms relative to said support columns, each of said clamp means including a portion mounted to the lower end of one of said support arms, vertically movable in said slot, and normally constrained to move in said slot whereby said support arms are positively prevented from being separated from said support columns.

2. The combination of claim 1 wherein said clamp means includes a pair of headed elements, each of said elements including a stud portion extending through said slot, secured to one of said support arms, and engageable with the upper terminus of said slot to prevent separation of said support arms from said support columns.

3. The combination of claim 2 wherein said stud portions are threadably connected to said support arms whereby said support columns are forcibly clamped between said support arms and the heads of said headed elements upon tightening rotation of said heads.

4. The combination of claim 1 wherein said support columns are hollow, telescopably receive said support arm therein, and are engaged by said first securement means and are thereby fixedly secured to the upper one of said frame portions, said clamp means includes a pair of cam elements pivotally mounted to said first securement means, pivotable about said support arms, respectively, and movable from an unclamped position to a clamped position to forcibly engage said first securement means and clamp said support arms in fixed position.

5. The combination of claim 4 wherein said support columns each includes a vertical slot extending through the upper end thereof, said support arms each includes a projection slidably receivable within said slot, and said cam elements each includes a slot enabling slidable passage of said projection in said unclamped position whereby said support arms are separable from said support columns only in said unclamped position of said cam elements.

6. The combination of claim 1 wherein said support columns extend between said first and second securement means and are fixedly secured to said frame portions by said first and second securement means, respectively.

7. The combination of claim 1 wherein said support columns terminate below said first securement means, and said support arms are slidably mounted by said first securement means.

8. In a head rest for projection above the upper extremity of the back of a vehicle seat, the combination of:
a hollow core made of deformable sheet material;
a layer of resilient and deformable material disposed over the top and front and back of said core the thickness of said material over said front and back being approximately equal to afford equal protection to both front and rear seat passengers of the vehicle;
and a flexible cover overlying said deformable material and said core.

References Cited
UNITED STATES PATENTS

| | | | |
|---|---|---|---|
| 3,084,978 | 4/1963 | Johansson | 297—397 |
| 3,159,427 | 12/1964 | Lawson | 297—410 |
| 3,185,207 | 5/1965 | Hermanns et al. | 248—413 |
| 3,253,859 | 5/1966 | Merriman et al. | 297—397 |
| 3,337,268 | 8/1967 | Belk | 297—397 |

CASIMIR A. NUNBERG, *Primary Examiner.*

U.S. Cl. X.R.
297—397